United States Patent [19]

Shaw et al.

[11] Patent Number: 4,735,485
[45] Date of Patent: Apr. 5, 1988

[54] ACOUSTO-OPTIC FREQUENCY SHIFTER USING OPTICAL FIBER AND METHOD OF MANUFACTURING SAME

[75] Inventors: Herbert J. Shaw, Stanford; Robert C. Youngquist, Montain View; Gordon S. Kino, Stanford; William P. Risk, Redwood City, all of Calif.

[73] Assignee: The Board of Trustees of the Leland Stanford Junior University, Stanford, Calif.

[21] Appl. No.: 581,176

[22] Filed: Feb. 17, 1984

[51] Int. Cl.⁴ .................. G02B 6/02; G02F 1/11; B32B 31/00
[52] U.S. Cl. .................. 350/96.29; 350/96.13; 350/96.15; 350/96.17; 350/358; 350/371; 350/320; 156/160; 156/161
[58] Field of Search ............... 350/96.10, 96.13, 96.14, 350/96.15, 96.17, 96.20, 96.29, 96.30, 353, 355, 356, 376, 375, 358, 370, 400, 371, 320; 156/160, 161; 250/227

[56] References Cited

U.S. PATENT DOCUMENTS

| 3,912,363 | 10/1975 | Hammer | 350/96.17 X |
| 4,018,506 | 4/1977 | Hammer | 350/96.17 |
| 4,067,643 | 1/1978 | Sugimura et al. | 350/96.15 |
| 4,086,484 | 4/1978 | Steensma | 350/96.29 |
| 4,097,118 | 6/1978 | Hammer | 350/96.17 |
| 4,236,786 | 12/1980 | Keck | 350/96.15 |
| 4,268,116 | 5/1981 | Schmadel et al. | 350/96.19 |
| 4,312,562 | 1/1982 | Segawa et al. | 350/96.15 |
| 4,588,296 | 5/1986 | Cahill et al. | 350/358 |
| 4,684,215 | 8/1987 | Shaw et al. | 350/96.29 |

FOREIGN PATENT DOCUMENTS

| 52-67345 | 6/1977 | Japan | 350/96.29 |
| 55-155324 | 12/1980 | Japan | 350/96.15 |

OTHER PUBLICATIONS

Rashleigh et al., "Preservation of Polarization in Single Mode Fibers" Fiberoptic Technology, May 1983, pp. 155-161.
Wang et al., "Studies for the Use of Gyrotropic and Anisotropic Materials . . . " J. of Appl. Phys., vol. 43, No. 4, 4/72, p. 1862.
Layton et al., "Optical Fiber Acoustic Sensor Using Mode-Mode Interference" Appl. Opt., vol. 18, No. 5, 3/79, pp. 666-670.
"Acoustic Optic Frequency Shifter for Single Mode Fibers," by K. Nosu, et al., Electronics Letters, vol. 19, No. 20, Sep. 29, 1983.
"Birefringent Fiber Polarization Coupler", R. C. Youngquist, et al., Optics Letters, vol. 8, No. 12, Dec. 1983, pp. 656-658.
"Integrated Optical Single Side Band Modulator and Phase Shifter", IEEE Journal of Quantum Electronics, vol. QE18, No. 4, Apr. 1982, pp. 767-771.
"Single Mode Fiber Optical Polarization Rotator", by R. Ulrich, et al., Applied Optics, vol. 18, No. 11, Jun. 1, 1979, pp. 1857-1861.
"The Design of Efficient Broadband Wedge Transducers", by J. Fraser, et al., Applied Physics Letters, vol. 32, No. 11, Jun. 1, 1978, pp. 698-700.
"Applications of Edge Bonded Transducers to SAW Components", by C. Lardat, et al., Proceedings of the EIII, vol. 64, No. 5, May 1976, pp. 627-630.
"Surface Waves and Ultrasonic Frequencies", by E. G. Cook, et al., ASTM Bulletin (TP 127), May 1954, pp. 81-84.
"Broadband Guided-Wave Optical Frequency Translator Using an Electro Optical Bragg Arry" by Kingston et al., Appl. Phys. Lett., vol. 42, No. 9 5/83, pp. 759-761.

Primary Examiner—William L. Sikes
Assistant Examiner—Brian M. Healy
Attorney, Agent, or Firm—Knobbe, Martens, Olson & Bear

[57] ABSTRACT

A fiber optic frequency shifter comprises an optical fiber having two propagation modes and an acoustic transducer for generating an acoustic wave. The transducer is positioned relative to the fiber to cause the wave fronts of the acoustic wave to acoustically contact the fiber at an angle of incidence which is less than 90° greater than 0°. Preferably, the wavelength of the acoustic wave is substantially equal to the beat length of the fiber times the sine of the angle of incidence.

24 Claims, 3 Drawing Sheets

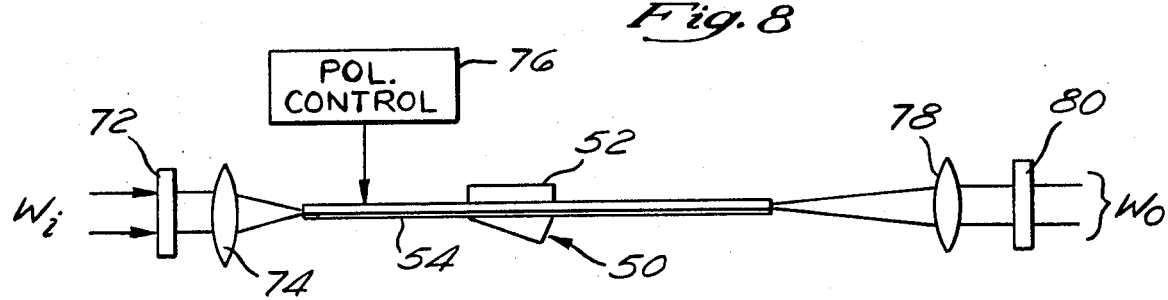
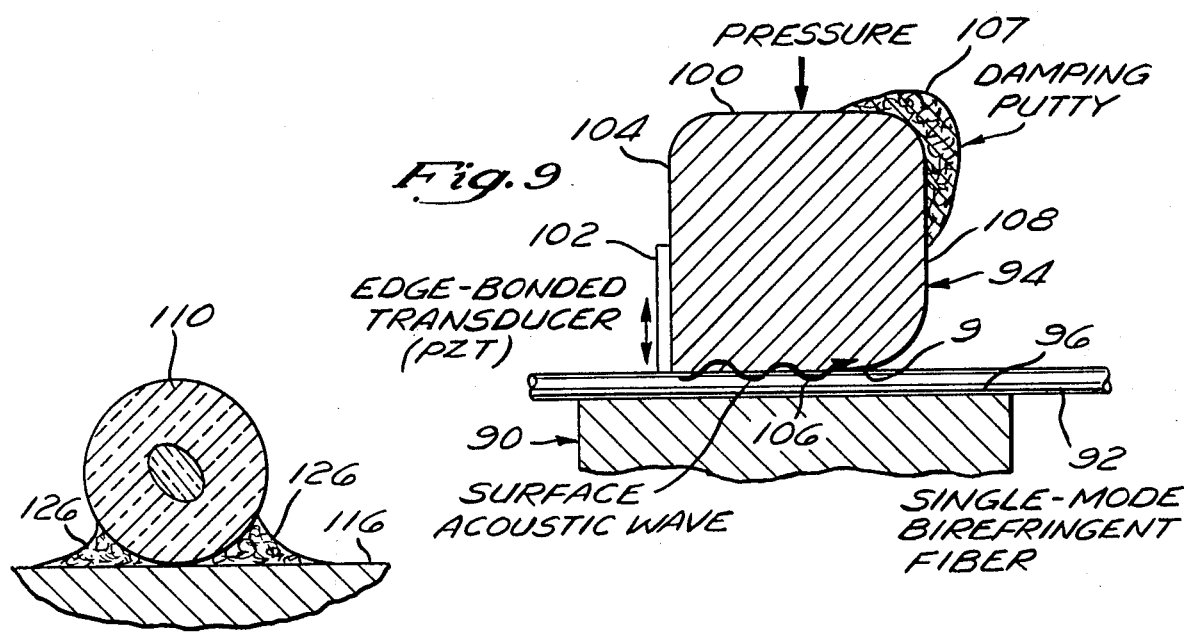
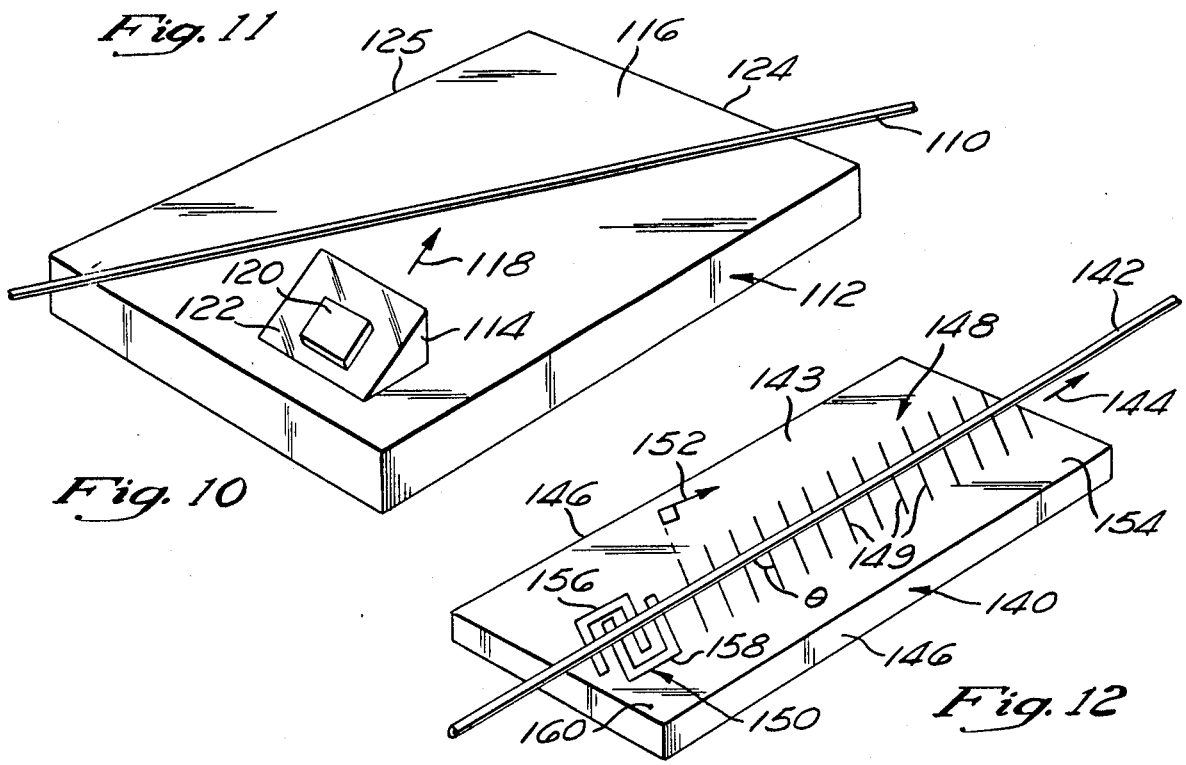

4,735,485

ACOUSTO-OPTIC FREQUENCY SHIFTER USING OPTICAL FIBER AND METHOD OF MANUFACTURING SAME

BACKGROUND OF THE INVENTION

The present invention relates to acousto-optic frequency shifters, and particularly to fiber optic frequency shifters utilizing surface acoustic waves or bulk acoustic waves.

Optical frequency shifting is typically based upon the Doppler effect, i.e., the change in frequency due to relative movement between the source and observer. The frequency becomes higher and the wavelength shorter when the source is moving towards the observer, and the frequency becomes lower and the wavelength higher when the source is moving away from the observer.

The Doppler effect has been heretofore used in bulk optics to cause frequency shifts in lightwaves reflected from wave fronts of acoustic waves propagating through optically transparent bulk media. The areas of compression and rarefaction caused by the travelling acoustic wave change the index of refraction in the bulk media so that the incoming light is reflected and/or refracted. Movement of the acoustic wave fronts causes a Doppler shift in the reflected and refracted light, such that the light is shifted in frequency by an amount equal to the frequency of the acoustic wave.

While bulk optic frequency shifters are well known, the development of fiber optic frequency shifters is in its infancy. Recently, a rudimentary fiber optic frequency shifter was disclosed by Nosu et al. in an article entitled "Acousto-Optic Frequency Shifter for Single Mode Fibers", published at the 47th International Conference on Integrated Optics and Optical Fiber Communications in Tokyo, June 27–30, 1983, and in *Electronics Letters*, Vol. 19, No. 20 (Sept. 29, 1983). A birefringent, single mode fiber was placed in a capillary tube filled with mineral oil, and the capillary tube was placed in the piezoelectric (PZT) cylinder in an off axis position. The PZT cylinder was filled with mineral oil. A standing pressure wave in each cylinder resulted when the cylinders were excited with sinusoidal signals to cause elasto-optic coupling between the polarization modes of the fiber, thereby creating side bands above and below the optical carrier. Each cylinder generated one side band that was in phase and another that was out of phase with the side bands created by the other cylinder, such that one side band was strengthened and the other cancelled.

The Nosu device thus functions by applying pressure to the fiber at discrete intervals along the fiber, specifically at intervals of three-quarters beat length of the fiber. The maximum frequency shift obtainable with the Nosu device is equal to the maximum rate which the PZT cylinders can be practically driven. Further, the amount of power coupled between polarization modes at each coupling—i.e., at each PZT cylinder—is quite small, and thus, to couple a significant amount of power a large number of these PZT cylinders would be required, yielding a quite unwieldy and generally impractical device for use in fiber optic systems.

As discussed in copending patent application Ser. No. 556,636, now U.S. Pat. No. 4,684,215, entitled "Single Mode Fiber Optic Single Side Band Modulator", by Shaw, Youngquist, and Brooks, an alternative approach to frequency shifting is to launch an actual acoustic wave (either a surface wave or bulk wave), for propagation longitudinally along the length of the optical fiber. This approach has the advantage of providing a continuous, virtually infinite, number of coupling points which travel along the length of the fiber, as opposed to the discrete static coupling points at spaced intervals of the Nosu device. Further, actual acoustic waves can be generated at a frequency which is higher than the PZT cylinders of Nosu can be driven, and thus, such actual acoustic wave devices are capable of greater amounts of frequency shift than the Nosu device.

One limitation on acousto optic frequency shifters which utilize actual acoustic waves is that, for maximum coupling between modes, the acoustic wavelength should be equal to the fiber beat length. For present, commercially available high birefringence fibers, the minimum beat length is on the order of 1 mm. An acoustic wavelength of 1 mm corresponds to an acoustic frequency of about 1–5 MHz. Accordingly, there is a need in the art for a fiber optic frequency shifter which utilizes actual acoustic waves, but avoids this limitation such that the maximum possible frequency shift is not restricted by the beat length of the fiber.

SUMMARY OF THE INVENTION

The present invention is a fiber optic frequency shifter comprising an optical fiber for guiding a lightwave and an acoustic transducer for generating an acoustic wave. The optical fiber has first and second modes (or optical paths), which propagate light at first and second velocities, respectively. In the preferred embodiment, the optical fiber is a birefringent fiber having two polarization modes, however, the optical fiber may also be a nonbirefringent fiber having first and second order modes. The acoustic transducer is positioned relative to the fiber to cause the wave front of the acoustic wave to acoustically contact the fiber at an angle of incidence $\theta$ which is less than 90° but greater than 0°. Thus, the wave fronts of the acoustic wave are neither normal to, nor parallel to the fiber, but at an angle thereto.

The wavelength of the acoustic wave should preferably be selected so that it is substantially phase matched to the beat length. In the present invention, such phase matching occurs when the acoustic wavelength in the direction of the propagation of the acoustic wave is equal to the beat length of the fiber times the sine of the angle of incidence. The acoustic wave fronts will then acoustically contact the fiber at beat length intervals, which is required for maximum coupling between the modes.

By directing the wave fronts at an angle relative to the fiber, rather than directing them longitudinally down the length of the fiber, the acoustic wavelength may be shorter than the fiber beat length, while still being properly phase matched, thereby permitting the use of higher acoustic frequencies than heretofore possible. Thus, the introduction of the angle of incidence as an additional variable circumvents the previously discussed limitation that the acoustic wavelength be equal to the beat length of the fiber.

The acoustic transducer may be either a bulk acoustic wave device or surface acoustic wave device. In the preferred embodiment, the transducer is a bulk acoustic wave transducer, since bulk waves can be generated at higher frequencies than surface waves. If a surface wave transducer is used, the fiber should be placed in acoustic contact with the surface in which the surface waves are excited. If desired, the transducer may be adjustably mounted relative to the fiber to selectively vary the angle of incidence of the acoustic wave, and thus, permit variation in the amount of frequency shift. The present invention is believed to be particularly useful at angles of incidence from 30° down to a fraction of a degree, as this produces at least a factor of 2 increase in the amount of frequency shift. For very high frequency shifts, angles of incidence of less thn 1° are preferred.

Acoustic contact of the acoustic wave may be enhanced by utilizing a substrate of anisotropic material to preferentially guide the acoustic energy of the wave substantially along the axis of the fiber, rather than in a direction normal to the wave fronts of the acoustic wave.

The present invention may be utilized as a single side band frequency shifter by inputting a lightwave to the frequency shifter exclusively in one of the modes, and then heterodyning the lightwave with the acoustic wave to cause at least a portion of the lightwave to be frequency shifted and coupled to the other mode. This coupled, frequency shifted light is then output in that other mode from the frequency shifter and any light remaining in the original mode is suppressed, e.g. by a modal filter to prevent such remaining light from being output. For example, if birefringent fiber is utilized, the polarization of the input light can be adjusted to lauch exclusively one of the polarization modes by means of a properly adjusted polarizer and polarization controller. Light output in the originally launched mode can be suppressed by means of a polarizer.

BRIEF DESCRIPTION OF THE DRAWINGS

These and other features of the present invention may best be understood through reference to the drawings in which:

FIG. 8 is a schematic drawing showing an arrangement in which the frequency shifter of the present invention may be utilized to provide a single side band modulator;

FIG. 9 is a partial cross sectional view of an alternative embodiment of the present invention which utilizes surface acoustic waves, and which comprises a weighted block having a flat surface which bears against an optical fiber, and an edge bonded transducer for producing a unidirectionally propagating surface acoustic wave in such flat surface;

FIG. 10 is a perspective view of a further embodiment of the present invention in which an optical fiber is bonded to a flat surface, and a shear wave transducer is utilized to produce a surface acoustic wave in such flat surface;

FIG. 11 is a schematic drawing showing a cross section of the fiber of FIG. 10 bonded to the flat surface by means of epoxy glue; and FIG. 12 is a perspective view of a futher embodiment of the present invention which utilizes a substrate of anisotropic material to preferentially guide the energy of the acoustic wave substantially down the axis of the fiber, even though the wave fronts are at an angle to the fiber.

DETAILED DESCRIPTION OF THE PREFERRED EMBODIMENT

The theory of operation of the present invention will be presented initially, followed by a description of the physical structure of the present invention.

Figure 1:
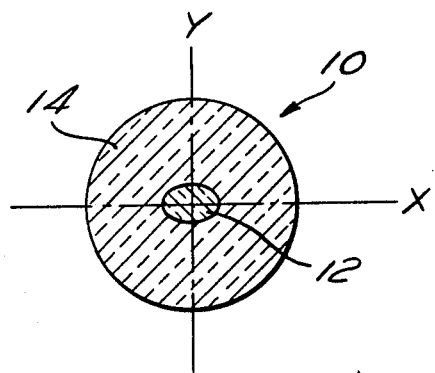
FIG. 1 is a cross sectional view illustrating the two orthogonal axes of birefringence of a single mode high birefringence fiber.

In the preferred embodiment, the frequency shifter of the present invention utilizes a birefringent single mode optical fiber 10, having a central core 12 of relatively high index of refraction and a surrounding cladding 14 of relatively low index of refraction, as shown in FIG. 1. As is well known, birefringent fiber has two orthogonal principle axes of birefringence, each of which corresponds to a polarization mode or optical path through the fiber. These axes are labelled X and Y in FIG. 1. Light which is linearly polarized along either of these two axes will remain linearly polarized as it propagates down the fiber. In general, light of any polarization can be regarded as a superposition of these two linearly polarized modes.

The two polarization modes of birefringent single mode optical fiber propagate light at slightly different velocities. Therefore, the phase of light in the X axis mode will change relative to that in the Y axis mode as the light propagates down the fiber. The distance, measured longitudinally along the fiber, required for light in one mode to separate in phase by 360° relative to light in the other mode is commonly referred to as the "beat length" of the fiber. Mathematically, the beat length may be defined as follows:

$$L = \lambda/\Delta n \qquad (1)$$

Where L is the beat length, $\lambda$ is the wave length of the light, and $\Delta n$ is the difference in index of refraction for the two polarization modes.

From equation 1 it may be seen that the beat length is inversely proportional to the difference in index of refraction between the modes, and thus, is inversely proportional to the birefringence of the fiber. Consequently, high birefringence fibers have shorter beat lengths than low birefringence fibers. The fiber 10 of the preferred embodiment is a high birefringence fiber having a beat length on the order of 1 mm. One common technique for fabricating high birefringence fibers is to draw the fiber such that the core has an elliptical shape, as illustrated by the core 12 in FIG. 1.

High birefringence fibers are advantageous in that the polarization modes are well defined, and thus the polarization of the applied light will be maintained over relatively long lengths of fiber, without significant coupling of light between the polarization modes. Thus, the polarization modes of a high birefringence fiber may be viewed as independent optical paths through the fiber, which are normally uncoupled such that light is not transferred between them.

As discussed in co-pending U.S. patent application, Ser. No. 556,305, filed Nov. 30, 1983 entitled "Birefringent Fiber Narrowband Polarization Coupler", co-pending U.S. patent application Ser. No. 556,636, filed Nov. 30, 1983, entitled "Single Mode Fiber Optic Single Sideband Modulator", and an article entitled "Birefringent Fiber Polarization Coupler", *Optics Letters*, Volume 8, No. 12 (December 1983), pages 656–658, selective coupling of light between the polarization modes of a birefringent single mode fiber may be achieved by applying a force to the birefringent fiber at an angle of about 45° relative to the principle axes of birefringence. Such force may be applied by squeezing the fiber between two anvils or plates on opposing sides of the fiber. Application of such force perturbs the axes of birefringence at the point of force, and causes the axes of birefringence to be rotated through a small angle. Consequently, when light launched in one linearly polarized mode reaches the localized perturbation, the light will decompose into a superposition of modes linearly polarized along the perturbed axes of birefringence, effectively coupling light from one polarization mode to the other. The coupled light is not frequency shifted because the stresses in the fiber are static, and do not travel down the fiber.

Figure 2:
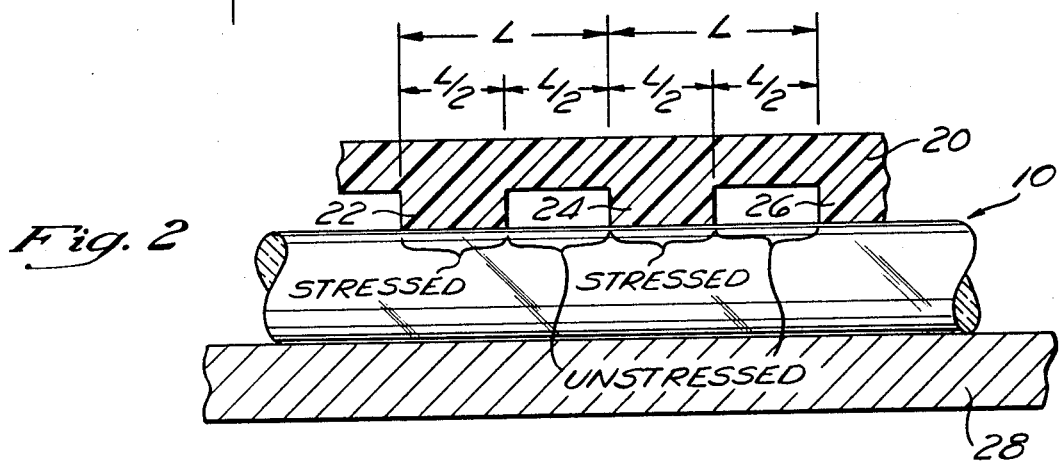
FIG. 2 is an elevation view in partial cross section which schematically shows a polarization coupler comprising a ridge structure for creating alternate stressed and unstressed regions in an optical fiber to cause coupling between the polarization modes of such optical fiber.

The foregoing may be more fully understood through reference to FIG. 2 which schematically depicts a ridge structure 20 comprising plural ridges 22, 24, 26 at spaced intervals. The fiber 10 is disposed between the ridges 22, 24, 26 and a base block 28, so that the fiber 10 may be squeezed therebetween. Application of force to the ridge structure 20 in a direction normal to the axes of the the fiber 10 perturb the axes of birefringence at each of the ridges 22, 24, 26 and provides alternate stressed and unstressed regions along the fiber 10 which cause coupling between the two polarization modes of the fiber 10. For maximum coupling between the modes, it is preferable that the ridges 22, 24, 26 be spaced at beat length intervals and that the length of each ridge be one half beat length. Satisfying these conditions causes the coupling at each ridge 22, 24, 26 to be cumulative with the coupling at the other ridges 22, 24, 26. By providing a sufficient number of ridges 22, 24, 26 one hundred percent of light input to one of the polarization modes can be coupled to the other of the polarization modes. A more complete description of this coupling phenomenon may be found in the above referenced article and patent applications, which are hereby incorporated by reference herein.

Figure 3:
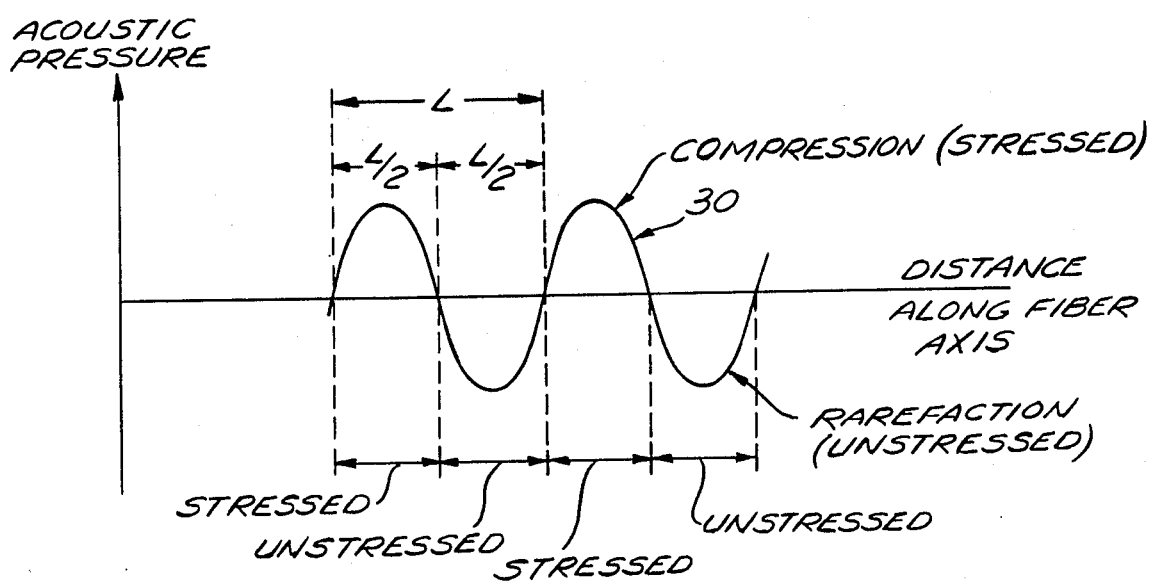
FIG. 3 is a graph of acoustic pressure verses the distance along the axis of an optical fiber, illustrating regions of compression and rarefaction caused by the wave front of a travelling acoustic wave which provide corresponding stressed and unstressed regions in the optical fiber.

The alternate stressed and unstressed regions provided by the ridge structure 20 of FIG. 2 may be alternatively provided by an actual travelling acoustic wave, such as the acoustic wave 30 of FIG. 3, which is launched to propagate longitudinally along the axis of the fiber 10. The periodicity of the travelling acoustic wave 30 provides alternate regions of compression and rarefaction so as to provide corresponding alternate stressed and unstressed regions in the fiber, and thus, cause coupling between the polarization modes of the fiber. For maximum coupling, it is preferable that the wave length of the acoustic wave 30 be selected such that it is equal to the beat length of the fiber. Since the acoustic wave is sinusoidal, each of the alternate regions of compression and rarefication will then be one half beat length in length, and thus, each of the alternate stressed and unstressed regions will also be one half beat length in length. From the foregoing, it will be understood that the acoustic wave 30 of FIG. 3, by providing alternate half beat length stressed and unstressed regions along the fiber, cumulatively couples light between the polarization modes of the fiber in much the same manner as the half beat length ridges 22, 24, 26 of FIG. 2. In addition, it should be understood that, while an acoustic wave length which is equal to the fiber beat length is preferred for maximum coupling, cumulative coupling will also occur if the wavelength is an odd multiple of beat lengths.

In contrast to the ridged structure 20 of FIG. 2 in which the fiber stresses produced by the ridges 22, 24, 26 are static, the fiber stress pattern produced by the traveling acoustic wave 30 of FIG. 3 travels down the fiber. Such travel of the stress pattern causes the light coupled from one polarization mode to the other to be shifted in frequency much as light from a moving source is Doppler shifted. In effect, the optical carrier wave and the acoustic wave are heterodyned such that the acoustic frequency and the optical carrier frequency combine both additively and subtractively to provide side bands at the sum and difference frequencies. If the acoustic wave propagates in the same direction as the light, light coupled from the faster polarization mode to the slower polarization mode is upshifted in frequency, while light propagating from th slower polarization mode to the faster polarization mode is downshifted in frequency. If the acoustic wave propagates in a direction opposite to that of the optical carrier, these relationships are reversed, so that light coupled from the faster mode to the slower mode is downshifted, while light coupled from the slower mode to the faster mode is upshifted.

Frequency shifted coupling requires that the acoustic wave be properly phased matched to the beat pattern of the optical modes in the fiber. In the present invention, such phase matching occurs when the acoustic wavelength, as measured along the axis of the fiber (rather than the direction of propagation of the acoustic wave), is equal to the beat length of the fiber. Stated differently, the propagation constant of the faster mode (lower index), the slower mode (higher index), and the acoustic wave should satisfy the following relationship:

$$k_1 + k_a = k_2 \tag{2}$$

where $k_1$ is the propagation constant of the faster mode; $k_2$ is the propagation constant of the slower mode; and $k_a$ is the component of the acoustic propagation constant along the fiber.

The frequency shifted coupling of light between the polarization modes may be examined mathematically by representing the light in the fast optical mode as $\cos(\omega t - k_1 z)$, where $\omega$ is the angular frequency of the light, t is time, and z is the distance along the fiber axis. The acoustic wave may be represented as $\cos(\omega_a t - k_a z)$, where $\omega_a$ is the angular frequency of the acoustic wave. The interaction of these two waves leads to a product term proportional to:

$$\tfrac{1}{2}\{\cos[(\omega+\omega_a)t-(k_1+k_a)Z]+\cos[(\omega-\omega_a)t-(k_1-k_a)Z]\} \quad (3)$$

The second term of Expression 3 does not satisfy the phase matching condition of Equation 2, and thus, it is expected that the signal represented by this term will die away. The first term, however, is phase matched to the slow mode, in accordance with expression (2) and explicitly indicates that the slow mode is upshifted. A similar analysis shows that if the slow mode interacts with the acoustic wave, the expression for the resulting interactin is:

$$\tfrac{1}{2}\{\cos[(\omega-\omega_a)t-(k_2-k_a)Z]+\cos[(\omega+\omega_a)t-(k_2+k_a)Z]\} \quad (4)$$

The second term of Expression 4, like the second term of Expression 3, is not phased matched, however, the remaining term is phased matched to the fast mode, in accordance with equation (2) and explicitly describes a downshifted wave.

Thus, from the foregoing analysis, it may be seen that the upper side band will be contained in one polarization, and the lower side band will be contained in the other. The desired side band can be selected by passing the output light through a polarizer.

The foregoing phase matching requirements indicate that, for an acoustic wave propagating longitudinally down the fiber with the wave fronts normal to the fiber axis, the acoustic wave frequency should be such that its wavelength is equal to the fiber beat length. Since fiber beat lengths are typically on the order 1 mm or more, the maximum available frequency shift from such longitudinally propagating acoustic wave is on the order of only a few megahertz.

Figure 4:
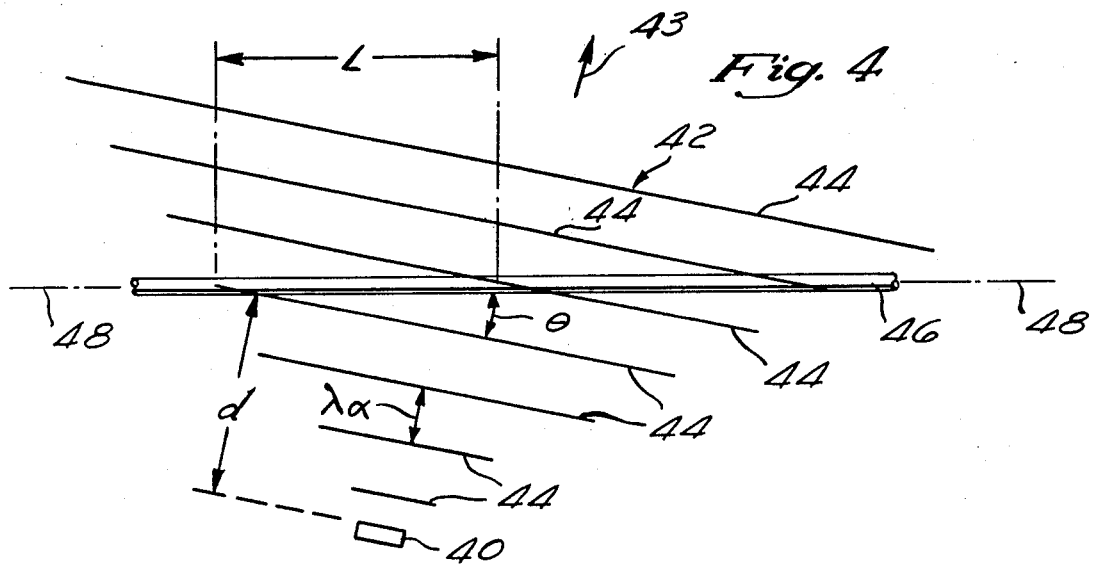
FIG. 4 is a schematic diagram of an optical fiber and an acoustic transducer, showing the acoustic wave fronts generated by such transducer directed to acoustically contact the fiber at an angle thereto, and illustrating that, for proper phase matching of the acoustic wave to the beat pattern of the fiber, the angle should be selected such that the distance between adjacent wave fronts as measured along the fiber is equal to the beat length of the fiber.
Figure 5:
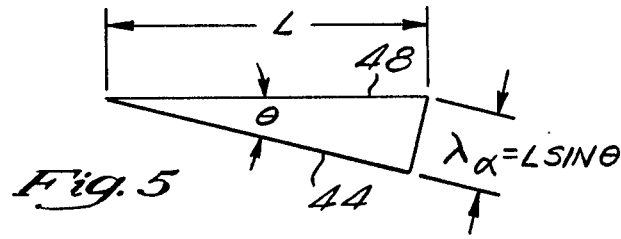
FIG. 5 is a diagram showing the relationship between the angle of incidence, beat length, and acoustic wavelength required for proper phase matching of the acoustic wave to the beat pattern of the fiber.

As shown in FIG. 4, the frequency shifter of the present invention circumvents this limitation by positioning an acoustic transducer 40 to produce an acoustic wave 42, which propagates in a direction, e.g. as indicated by the arrow 43, which is at an angle to the axis 48 of a high birefringence single mode optical fiber 46. Such positioning causes the wave fronts 44 of the wave 42 to be directed to acoustically contact the high birefringent single mode optical fiber 46 at an angle $\theta$, referred to herein as "the angle of incidence". As used herein, the term "angle of incidence is defined as the acute angle between a wavefront of an acoustic wave impinging on the fiber and the longitudinal axis of that fiber. The wavelength $\lambda_a$ (which is measured in the direction of propagation 43) of the acoustic wave 44 and the angle of incidence, $\theta$, are preferably selected such that adjacent wave fronts 44 are spaced by one fiber beat length, L, which is measured in a direction along the fiber axis 48. This beat length spacing of the wave fronts 44 satisfies the phase matching conditions set forth above, and thus, the component of acoustic propagation along the fiber axis 48 will satisfy Equation 2, above. This arrangement permits the use of much shorter acoustic wavelengths, and thus, much higher acoustic frequencies than heretofore possible, while still satisfying the phase matching condition. As illustrated in FIG. 5, simple trigonometry shows that the phase matching condition will be satisfied when:

$$\lambda_a = L\sin\theta \quad (5)$$

Accordingly, by varying the angle of incidence, $\theta$, the acoustic wavelength, and thus, the acoustic frequency may be readily changed. Equation 5 may be rewritten in terms of the acoustic frequency $\omega_a$, as follows:

$$\omega_a = \frac{2\pi V_a}{L\sin\theta} \quad (6)$$

where $V_a$ is the propagation velocity of the acoustic wave.

Figure 6:
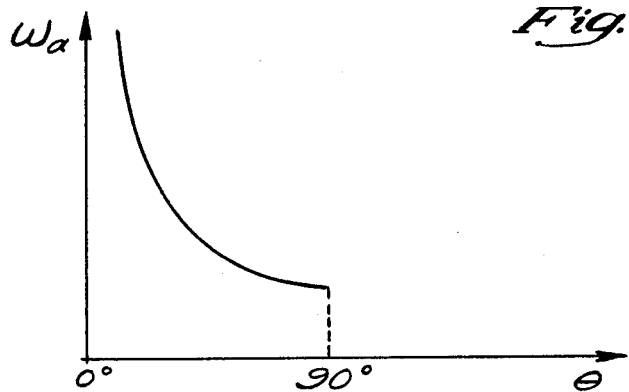
FIG. 6 is a graph of acoustic frequency as a function of the angle of incidence, illustrating that small angles of incidence permit the use of acoustic frequencies which are quite high, and yield correspondingly high frequency shifts.

FIG. 6 graphically illustrates the relationship between the acoustic frequency and the angle of incidence, and shows that for very small angles of incidence (e.g. a few degrees or a fraction of a degree), the acoustic frequency utilized may be quite high. Note that the acoustic frequency is at a minimum when $\theta$ equals 90° (i.e. when the acoustic wavefronts are normal to the fiber). By way of example, an angle of incidence of 3° would permit use of an acoustic frequency of 95 MHz for a fiber having a 1 mm beat length. Further, by adjustably mounting the acoustic transducer 40 (FIG. 4) the angle of incidence may be varied without disturbing the fiber 46, thus, yielding a variable fiber optic frequency shifter. Such adjustable mounting is also advantageous for tuning the angle of incidence for proper phase matching at the selected frequency.

By directing the wave 42 at an angle relative to the fiber 46, the propagation phase velocity of the wave 42 will be higher in the direction along the fiber axis 48 than along the direction of propagation 43. The term "propagation phase velocity", as used herein, is defined as the velocity, measured along a particular line of measurement (e.g. the direction 43 or axis 48), with which the intersection of a wave front (e.g. one of the wave fronts 44) and that axis of measurement move.

Preferably the minimum spacing between the acoustic transducer 40 and the fiber 46, measured in the direction of propagation 43, as indicated by the dimension d, is at least equal to the length of the Fresnel region of the wave 42, so that the wave 42 contacts the fiber 46 in the Fraunhofer region. As is well known, the length of the Fresnel region is determined by the geometry of the transducer, as well as the wavelength of the wave 42. In the Fraunhofer region, the wave fronts are better defined than in the Fresnel region, although the wave tends to diverge rapidly after entering the Fraunhofer region, thereby decreasing in intensity. The wave 42 will be well defined at maximum intensity substantially at the juncture between the Fresnel and Fraunhofer regions, and for some applications it may be preferable to place the fiber at such juncture.

Figure 7:
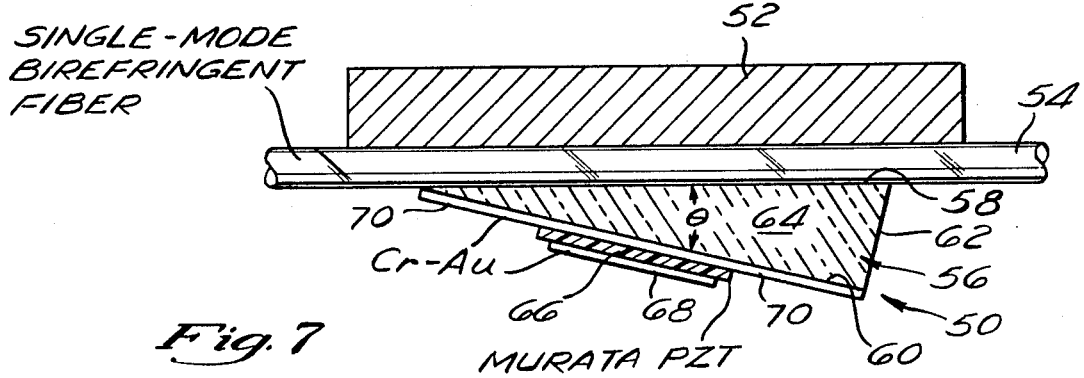
FIG. 7 is an elevation view, in partial cross section, of a preferred embodiment of the frequency shifter of the present invention which utilizes bulk acoustic waves, and which comprises a wedge-shaped block against one side of the fiber having a surface inclined at the required angle of incidence so as to produce acoustic waves which acoustically contact the fiber as such angle of incidence.

Although the frequency shifter of the present invention may comprise either a bulk wave device or a surface wave device, the preferred embodiment is a bulk wave device, as it is possible to generate bulk waves at higher frequencies than surface waves, thereby permitting higher frequency shifts. As shown in FIG. 7, the preferred embodiment comprises a bulk acoustic wave transducer 50 and an aluminum block or pressure plate 52, with a single mode birefringent optical fiber 54 therebetween. The transducer 50 and pressure plate 52 are mechanically coupled or clamped together, so as to press against the fiber 54 from opposite sides thereof to ensure good acoustic contact of the transducer 50 with the fiber 54. Preferably, the pressure plate 52 bears against the fiber 54 through a length therealong at least as great as the corresponding length of the transducer 50. Any suitable means may be used to mechanically couple the transducer 50 and plate 52, such as nuts and bolts (not shown). Preferably such bolts should be spring loaded to permit adjustment of the static pressure on the optical fiber 54. Further, it may be advantageous to apply an acoustic coupling gel (not shown) between the fiber 54 and transducer 50 to enhance the acoustic contact. By way of specific example, the coupling gel may be Sonotrak diagnostic medical ultrasonic scanning couplant, available from Echo Laboratories, Lewistown, Pa. The static pressure exerted on the fiber should be carefully adjusted so that it is just enough for good acoustic contact. Too much pressure may cause a significant amount of unwanted coupling of non-frequency shifted light between the polarization modes.

The transducer 50 of the preferred embodiment is formed of a wedge-shaped block, e.g. of fused quartz 56, and has a triangular cross section. The wedge-shaped block 56 has five flat surfaces, namely, a rectangularly-shaped hypotenuse surface 58, a rectangularly-shaped first side surface 60, a rectangularly-shaped second side surface 62, and a pair of triangularly-shaped end surfaces 64, only one of which is visible in FIG. 7. Thus, the hypotenuse surface 58 forms the hypotenuse edge of the triangularly-shaped cross section, while the side surfaces 60, 62, which are mutually perpendicular, form the side edges of the triangularly-shaped cross section. The block 56 is disposed so that the hypotenuse surface 58 contacts the optical fiber 54, preferably such that the axes of birefringence are at 45° relative to the surface 58. The end surfaces 64 are perpendicular to the surfaces 58, 60, 62, and are parallel to the longitudinal axis of the optical fiber 54. The side surface 60 forms an angle $\theta$ with the hypotenuse surface 58. The side surface 62 is opposite this angle $\theta$.

A thin slab of piezoelectric (PZT) material 66 is bonded between two electrodes 68, 70, and the electrode 70, in turn, is bonded to the first side surface 60 of the quartz block 56. The PZT slab is thus poled orthogonal to the first side surface 60 of the quartz block 56 so that, when the electrodes are driven by an electric signal generator (not shown) the PZT slab 66 will oscillate to excite a longitudinal bulk wave having generally planar wavefronts which travel through the quartz wedge at the angle $\theta$ relative to the longitudinal axis of the fiber 54. The incident acoustic wave is properly phased matched to couple the two optical modes, as discussed in reference to FIG. 4, through proper selection of the angle $\theta$ and the acoustic frequency. Advantageously, reflections within the wedge 56 do not produce significant spurious side bands because they are not properly phased matched to the beat pattern of the optical modes.

The above-described frequency shifter may be utilized to provide single side band modulated light. Referring to FIG. 8, an input light wave, $W_i$ is first passed through modal filter, e.g. a polarizer 72, to ensure that the light is linearly polarized along one of the principal axes of birefringence of the fiber 54. As indicated previously, the direction of frequency shift (i.e. upshift or downshift) is determined not only by whether light is input to the fast mode or slow mode, but also the direction of acoustic wave propagation. A lens 74 is used to focus light from the polarizer 72 for introduction into the end of the fiber 54. Since the mechanical coupling of the transducer 50 and plate 52 may yield some static stress in the fiber which may perturb the axes of birefringence, a polarization controller 76 is provided just before the acoustic transducer to permit final adjustment of the polarization to compensate for any such perturbation of the axis of birefringence. One type of birefringent single mode fiber polarization controller, which is suitable for use with the present invention, is described in an article by R. Ulrich and M. Johnson entitled "Single Mode Fiber Optical Polarization Rotator", *Applied Optics*, Vol. 8, No. 11 (June 1, 1979), pages 1857-1861.

As the light propagates through the fiber optic frequency shifter, it is at least partially coupled from the mode to which it was input, to the orthogonal mode, and such coupled light is shifted in frequency by an amount equal to the acoustic frequency, in accordance with the discussion in reference to FIGS. 3-7. The light exiting the fiber 54, therefore, will contain frequency shifted light in one mode, and, if the input light was not 100% coupled, non-shifted light in the other mode. The light is then passed through a lens 78, for collimation purposes, and then through a modal filter, e.g. polarizer 80, oriented to block the non-shifted light in the original input mode, so that only the shifted light is passed by the polarizer 80 to form an output wave, $W_0$. Although the drawing of FIG. 8 shows bulk optic polarizers, those skilled in the art will understand that in-line fiber optic polarizers, such as described in U.S. Pat. No. 4,386,822 may be advantageous for many applications.

The fiber optic frequency shifter of FIG. 7 was tested as a single side band modulator utilizing an arrangement similar to that shown in FIG. 8. The transducer 50 was driven at 15 MHz with 2.25 watts of power. The angle of incidence was 13.5° and the fiber beat length was 1.65 mm at 632.8 nm. Both the 632.8 nm carrier and unwanted side band were suppressed by better than 20 db below the desired side band. The input polarization and static stress on the fiber by the plate and transducer were carefully adjusted so that the output light at the input optical carrier frequency was in the input polarization upon leaving the frequency shifter, so that it could be suppressed by correct adjustment of the output polarizer 80.

An alternative embodiment of the present invention, which may be preferable for some applications, is shown in FIG. 9. Unlike the bulk wave device of FIG. 7, the device of FIG. 9 is a surface acoustic wave frequency shifter. This device comprises a rectangular lower base block 90, e.g. of aluminum, for supporting a single mode birefringent fiber 92. A rectangular upper block 94, e.g. of aluminum, is placed on top of the optical fiber, so that the fiber 92 is between the flat upper surface 96 of the lower block 90 and the flat lower surface 98 of the upper block 94. Pressure is applied to the upper surface 100 of the upper block 94 to force the surfaces 96, 98 of the blocks 90, 94, respectively, against the optical fiber 92 to ensure good acoustic contact.

Such pressure may be achieved by applying weights (not shown) to the upper surface 100. Except for the pressure provided by these weights and the weight of the upper block 94 itself, there is no mechanical coupling between the upper and lower blocks, 90, 94. As with the transducer of FIG. 7, an acoustic coupling gel between the surface 98 and the fiber 92 may improve acoustic contact.

An edge bonded PZT transducer 102 is bonded to a side surface 104 of the upper block 94. This transducer 102 has electrodes (not shown) bonded to the faces of a PZT slab. When the electrodes are driven with an AC signal, the PZT, which is poled in a direction orthogonal to the lower surface 98 of the upper block 94, will oscillate to induce a surface acoustic wave on the lower surface 98 of the upper block 94, as illustrated by the wave 106 in FIG. 9. The transducer 102 is positioned at one corner of the block, at the juncture between the lower surface 98 and side surface 104, which is the lower left-hand corner as viewed in FIG. 9. Note that, while this lower left-hand corner is square, the remaining corners of the upper block have been rounded to reduce reflections. The rounded corners also reduce the possibility of exciting a bulk wave in the upper block 94. Suppression of unwanted surface acoustic waves is achieved by placing some dampening material 107 on the surface of the upper block 94. Such material may be positioned diagonally from the transducer 102, i.e. at the upper right corner as viewed in FIG. 9, where the upper surface 100 joins a side surface 108. This dampening material 107 will absorb any surface acoustic waves traveling along the surfaces 104, 100, and 108, so that the only surface wave propagating along the surface 98 will be the wave 106. By way of specific example, the material 107 may be Dux-Seal, available from Johns-Mansville, Vernon, Calif.

Edge bonded surface acoustic wave transducers are well-known in the art, and are described in various publications such as in an article entitled "Applications of Edge Bonded Transducers to SAW Components", *Proceedings of the IEEE*, May 1976, pages 627–630.

As the surface wave 106, shown in FIG. 9, propagates along the lower surface 98, the undulating lower surface 98 is forced into intimate contact with the fiber, thereby producing a traveling stress pattern in the fiber. As discussed in reference to FIGS. 3–6, if the frequency (or wavelength) of the surface acoustic wave 106 is phase matched to the beat length of the fiber 92, light will be coupled from one of the polarization modes of the fiber 92 to the other of the polarization modes, and such coupled light will be frequency shifted by an amount equal to the frequency of the acoustic wave 106. Again, the pressure applied to the upper surface 100 of the upper block 94 should be just enough to ensure good acoustic contact, since such pressure may perturb the axes of birefringence of the fiber through the length of the lower surface 98. Single side band modulation may be achieved utilizing the same arrangement shown in FIG. 8. Test results utilizing a similar arrangement were conducted in which the transducer was driven at a frequency of 1.45 MHz, which yields an acoustic wavelength equal to the beat length of the fiber (1.65 mm at 632.8 nm). Better than 30 db suppression of the unwanted side band was measured.

Variable amounts of frequency shift may be obtained utilizing the surface wave device of FIG. 9 by rotating the upper block relative to the lower block so that the wave fronts of the surface wave 106 acoustically contact the fiber 92 at the selected angle of incidence, which, of course, should be phase matched to the beat length of the fiber, at the particular acoustic wavelength, as discussed in detail in reference to FIG. 4. Such rotational repositioning of the block 94 may be readily achieved since the upper block 94 and lower block 90 are not mechanically coupled together.

In a further embodiment of the present invention, an optical fiber 110 is affixed, e.g. by epoxy gluing or indium bonding, to the upper surface of a base block 112, formed e.g. of silicon. Silicon is advantageous since it propagates surface waves at a relatively high velocity. A shear wave transducer 114 is utilized to generate a surface acoustic wave for propagation along the flat upper surface 116 of the block 112 towards the fiber 110 in a direction e.g. as indicated by the arrow 118. Shear wave transducers are well-known in the art, and may comprise e.g. a wedge-shaped block of quartz having a cross section which is a right triangle in shape. In the embodiment shown, a $LiNbO_3$ slab is bonded to the hypotenuse face or surface 122 of the wedge-shaped block 114. Electrodes (not shown) are placed on the slab 120 so that the slab 120 is shear polarized in a direction parallel to the face 122. Application of an appropriate AC driving signal to the electrodes causes oscillations in the slab 120 which generate shear waves in the quartz block. The shear waves are directed downward, towards the upper surface 116 of the block 112, at an angle determined by the shape of the wedge 114. The shear waves induce a surface acoustic wave in the surface 116, which propagate toward the fiber in the direction indicated by the arrow 118. Further details of shear wave wedge transducers may be found in the literature, such as in a report by Fraser entitled "Design of Efficient, Broadband Ultrasonic Transducers," Ginzton Lab Report ·2973 (May 1979), available through the W. W. Hansen Laboratories Reports Office, Edward L. Ginzton Laboratory, Stanford University, Stanford, Calif. 94305, and from University Microfilms International, 300 N. Zeeb Road, Ann Arbor, Mich. 48106. An alternative approach, utilizing a longitudinal wave wedge transducer, is described in an article by Fraser et al., entitled "The Design of Efficient Board Band Wedge Transducers", *Applied Physics Letters*, Vol. 32, No. 11, (June 1, 1978), pages 698–700, and in an article by Cook et al., entitled "Surface Waves at Ultrasonic Frequencies", *ASTM Bulletin, TP* 127 (May 1954) pages 81–84.

The frequency shifter shown in FIG. 10 is advantageous in that the freestanding mounting of the fiber does not require upon any static stresses to hold the fiber in place, and thus, perturbation of the axis of birefringence is reduced or eliminated. In addition, the direction or propagation of the surface acoustic wave, indicated by the arrow 118, and thus the angle of incidence, can be changed by repositioning the wedge-shaped block 114 on the surface 116, since the block 114 and surface 116 are not mechanically coupled. Thus, the embodiment of FIG. 10 permits variable frequency shifting, and the selected frequency shift can be obtained by adjusting the direction of propagation of the surface acoustic wave to yield the angle of incidence required for phase matching at the particular frequency desired. It is preferable to place an absorbing material (not shown) such as black wax, along the sides 124, 125 of the block 112 to prevent backward reflection of the acoustic wave from such sides 124, 125.

As shown in FIG. 11, one method of affixing the fiber 110 to the surface 116 is by means of a bonding substance, e.g. epoxy glue 126. To ensure good acoustic contact between the surface 116 and fiber 110, it is believed preferable to apply pressure, e.g. by means of weights to the top of the fiber so as to press the fiber 110 against the surface 116 with a constant force while the glue 126 is curing. Such weights should of course, be removed after the glue has cured, and prior to using the device as a frequency shifter. Once the weights are removed, the bonding substance 126 will be in tension, so as to draw the fiber against the surface 116 for good acoustic contact. In addition, the fiber 110 should preferably be affixed such that the axes of birefringence are at 45° relative to the surface 116 as indicated in FIG. 11.

Although the propagation phase velocity of an acoustic wave may be measured along various axes, as discussed in reference to FIG. 4, the term "phase propagation direction" is ordinarily used to define a direction which is normal to the acoustic wave front, and will be used in that sense for the purposes of the present discussion. Thus, the phase propagation direction in FIG. 4 is shown by the arrow 43, and the corresponding phase propagation direction in FIG. 10 is shown by the arrow 118. If an acoustic wave propagates through an isotropic material, such as quartz, the direction of acoustic energy flow or propagation will be the same as the phase propagation direction, i.e. in a direction normal to the acoustic wave fronts. However, if the acoustic wave is in an anisotropic material, the acoustic energy propagation direction will, in general, be different than the phase progation direction. As is well known to those skilled in the art, the energy propagation direction of an anisotropic material is determined by the atomic or crystalline structure of the material. Thus, unlike isotropic materials, anisotropic cause the acoustic energy to preferentially propagate in a direction referred to herein as the energy propagation direction which is not the same as the phase propagation direction. In general, each phase propagation direction will have a corresponding energy propagation direction, both of which depend on the relative orientation of the crystalline structure and the transducer.

While the silicon block 112 of FIG. 10 is anisotropic, it is only weakly so, and thus, the phase propagation directions and energy propagation directions will be substantially similar. Further, the orientation of the atomic structure at the surface 116, if desired, may be chosen so that the silicon behaves as an isotropic material.

The acoustic propagation properties of anisotropic materials may be advantageously utilized in the present invention to enhance the acoustic contact of the acoustic wave fronts with the optical fiber. For example, referring to FIG. 12, a substrate 140 may be formed from a thin strip of a strongly anisotropic material such as $LiNbO_3$. An optical fiber 142 is mounted on the surface 143 of the substrate 140, (e.g. in the manner described in reference to FIG. 11) such that the longitudinal axis of the fiber 142 is parallel to the energy propagation direction of the anisotropic substrate 140, which direction is illustrated by the arrow 144 in FIG. 12. In the embodiment shown, the substrate 140 is formed as a thin rectangular strip with longitudinal sides 146 parallel to the axis of the fiber 142 and the direction of energy propagation 144. A surface acoustic wave 148 is produced by an interdigital transducer 150. Those skilled in the art will understand that this transducer 150 must be properly positioned relative to the crystalline structure of the substrate surface 143 so as to yield the desired energy propagation direction 144 and the desired phase propagation direction 152. In the present invention, the transducer is positioned to propagate the acoustic wave energy longitudinally along the surface 143, in the direction 144. The transducer 150 is also positioned so that phase propagation direction 152 for the acoustic wave is at an angle of incidence $\theta$ to the fiber 142. Although the wave fronts 149 of the acoustic wave 148 will thus be directed at an angle relative to the fiber 142 (in the same manner as the wave fronts 44 in FIG. 4), the acoustic energy of those wave fronts will propagate longitudinally down the fiber in the direction 144. This ensures that the acoustic wave fronts 149 will acoustically contact the fiber 142 substantially throughout the length of the fiber-substrate interface. If the acoustic energy of acoustic wave 148 propagated in the direction 152, rather than the direction 144, the wave fronts 149 may not be of sufficient length to contact the fiber 142 throughout such interface, and would tend to propagate to the side 146 of the substrate 140, rather than to the end 154 opposite the transducer 150. Thus, it will be recognized that utilizing an anisotropic material for the substrate 140 is highly advantageous.

Those skilled in the art will understand that the interdigital transducer 150 may comprise thin electrodes 156, 158 which are bonded directly to the surface 143 between the substrate 140 and the fiber 142 at the end 160 of the substrate 140, which is opposite the end 154. Interdigital transducers are well known in the art and are described in articles by W. R. Smith, et al. entitled "Analysis of Interdigital Surface Wave Transducer by Use of an Equivalent Circuit Model" and "Design of Surface Wave Delay Lines with Interdigital Transducers", *IEEE Transactions on Microwave Theory and Techniques,* Vol. MTT-17, No. 11, pages 856–864 and 865–873, respectively, (November 1969). The electrodes for interdigital transducers each typically comprise a set of electrically connected finger-like projections which are interleaved with a similar set of electrically connected finger-like projections of the other electrode, as shown in FIG. 12. The electrodes 156, 158 are driven by an A.C. signal generator to cause oscillations in the substrate 140 which produce the surface acoustic wave 148. As discussed in reference to FIG. 10, it is preferable to place an acoustic absorbing material (not shown), such as black wax, along the edge of the substrate 140 at the end 154 to prevent unwanted reflections of the acoustic wave 148.

Although all of the above embodiments have been described in terms of a birefringent single mode fiber in which frequency shifted light is coupled between the two polarization modes of such fiber, nonbirefringent fiber may alternatively be utilized in the present invention. In the case of nonbirefringent fiber, the fiber should be selected to support two modes, namely, the first and second order modes for the particular wavelength of light utilized. By phase matching the beat length between the first and second order modes to the acoustic wavelength, in the same manner as discussed for polarization modes in reference to FIGS. 4–6, frequency shifted light will be coupled between the two modes, i.e. from the first order mode to the second order mode. Such coupling is due to perturbation of the modes caused by the acoustic stresses as they travel down the fiber. A more detailed explanation of the theory for such modal coupling is discussed in copending patent application Ser. No. 556,306 filed Nov. 30, 1983, entitled "Fiber Optic Modal Coupler", which is hereby incorporated by reference herein. A nonbirefringent fiber may thus be alternatively utilized in the single side band modulator of FIG. 8. However, in such case, the polarization controller 76 and polarizers 72, 80 are not required. The input light should be launched exclusively in the second order mode of the fiber, and a modal filter, e.g. mode stripper (not shown), should be placed at the output end of the device to suppress the second order mode such that only frequency shifted light coupled to the first order mode is output from the device.

What is claimed is:

1. A fiber optic frequency shifter, comprising:
   an optical fiber having a longitudinal axis and having first and second modes which propagate light at first and second velocities, respectively, in a direction along said longitudinal axis, said fiber having an optical beat length along said longitudinal axis for said first and second modes;
   an acoustic transducer for generating an acoustic wave, said transducer position relative to said fiber to cause the wave fronts of said acoustic wave to acoustically contact said fiber at an angle of incidence with respect to said longitudinal axis which is less than 90° but greater than 0° to provide an acoustic wave front spacing along said longitudinal axis which cooperates with the optical beat length of said fiber for said first and second modes to cause cumulative coupling of frequency shifted light from said first mode to said second mode at said angle of incidence, said frequency shifted light propagating in said optical fiber in said direction along said longitudinal axis.

2. A fiber optic frequency shifter, as defined by claim 1, wherein the wave front spacing along said longitudinal axis is substantially equal to the optical beat length of said fiber along said longitudinal axis times the sine of the angle of incidence.

3. A fiber optic frequency shifter, as defined by claim 1, wherein said fiber is a birefringent single mode fiber and said modes are the two orthogonal polarization modes of said birefringent single mode fiber.

4. A fiber optic frequency shifter, as defined by claim 1, additionally comprising:
   a member having a surface, said fiber positioned in acoustic contact with said surface and said acoustic wave comprising a surface acoustic wave which propagates along said surface.

5. A fiber optic frequency shifter, as defined by claim 1, wherein said acoustic wave is a bulk acoustic wave.

6. A fiber optic frequency shifter, as defined by claim 1, wherein said transducer is movably mounted for positional adjustment relative to said fiber to selectively vary said angle of incidence of acoustic wave with respect to said longitudinal axis.

7. A fiber optic frequency shifter, as defined by claim 1, wherein said acoustic wave causes light input in said first mode to be coupled to said second mode such that said coupled light is shifted in frequency by an amount equal to the frequency of said acoustic wave.

8. A fiber optic frequency shifter, as defined by claim 7, additionally comprising:
   a modal filter for suppressing output light from said frequency shifter in said first mode.

9. A fiber optic frequency shifter, as defined by claim 1, additionally comprising a substrate for preferentially guiding the acoustic energy of said acoustic wave substantially along the axis of said fiber.

10. A fiber optic frequency shifter, as defined by claim 9, wherein said substrate is formed from an anisotropic material.

11. A fiber optic frequency shifter, as defined by claim 1, wherein said angle of incidence is less than 30°.

12. A fiber optic frequency shifter comprising:
    an optical fiber having a longitudinal axis, said optical fiber propagating light in two modes and having an optical beat length along said longitudinal axis for said two modes;
    an acoustic wave device for generating an acoustic wave having a plurality of wave fronts and having a wavelength shorter than said optical beat length, said acoustic wave device positioned to direct said wave fronts toward said fiber such that said wave fronts acoustically contact said optical fiber at an angle of incidence with respect to said longitudinal axis which is less than 90° and greater than 0°, said acoustic wave having a first propagation phase velocity in the direction of propagation of said wave, and a second propagation phase velocity in a direction along the longitudinal axis of said fiber, said second propagation velocity higher than said first propagation velocity, the wavelength of said acoustic wave substantially equal to the beat length of said fiber for said two modes times the sine of said angle of incidence, so that said acoustic wave fronts are spaced apart in said direction along said longitudinal axis of said optical fiber by a distance substantially equal to the optical beat length of said optical fiber.

13. A fiber optic frequency shifter, as defined by claim 12, further including a source of light at an optical frequency, and wherein said optical fiber comprises a nonbirefringent optical fiber which has only two modes of propagation at said optical frequency.

14. A fiber optic frequency shifter, comprising:
    an optical fiber having a longitudinal axis and having two modes for propagating light in a light propagation direction along said longitudinal axis;
    an acoustic wave device for generating an acoustic wave having acoustic energy and an acoustic wavelength, said acoustic wave comprising wave fronts directed to acoustically contact said fiber at an angle with resect to said longitudinal axis; and
    an anisotropic substrate in acoustic contact with said fiber for guiding the acoustic energy of said wave in an acoustic energy propagation direction substantially parallel to said longitudinal axis of said fiber, said acoustic energy interacting with said light to cause light in one of said two modes to be cumulatively coupled to the other of said two modes and to be shifted in frequency by said acoustic frequency, said coupled light propagating along said longitudinal axis of said fiber in said light propagation direction.

15. In a fiber optic frequency shifter comprising an optical fiber having two modes for propagation of optical energy in a direction along the longitudinal axis of said fiber, said two modes having an optical beat length along said longitudinal axis, a method of coupling frequency shifted light between said modes, said method comprising:
    generating an acoustic wave, said acoustic wave having a wavelength shorter than said optical beat length;

directing said acoustic wave such that its wave fronts make acoustic contact with said fiber at an angle of incidence with respect to said longitudinal axis which is less than 90° but greater than 0°, and selecting the angle of incidence such that said wavelength of said acoustic wave is phase matched to said optical beat length to cause cumulative coupling of frequency shifted light from one of said modes to the other, said frequency shifted light propagating in said fiber along said longitudinal axis in said direction.

16. In a fiber optic frequency shifter, a method of coupling frequency shifted light, as defined by claim 15, wherein the wavelength of said acoustic wave is substantially equal to the optical beat length of said fiber times the sine of said angle of incidence.

17. In a fiber optic frequency shifter, a method of coupling frequency shifted light, as defined by claim 15, wherein said acoustic wave is a bulk acoustic wave.

18. In a fiber optic frequency shifter comprising an optical fiber, a method of optical frequency shifting, comprising:

propagating an optical signal in a first optical mode of said fiber in a light propagation direction along the longitudinal axis of said fiber;

directing an acoustic wave to acoustically contact said fiber such that said wave has an acoustic phase propagation direction at an angle to said longitudinal axis of said fiber, and an acoustic energy propagation direction substantially parallel to said longitudinal axis of said fiber, said acoustic wave interacting with said optical signal and causing at least a portion of said optical signal to be cumulatively coupled to a second optical mode at a shifted optical frequency and to propagate in said second optical mode along said longitudinal axis in said light propagation direction.

19. A fiber optic frequency shifter, comprising:

a member, having a surface;

an acoustic wave device for producing a surface acoustic wave in said surface, said acoustic wave having an acoustic wavelength; and an optical fiber, having a longitudinal axis, said fiber also having first and second optical propagation modes and an optical beat length for said two optical propagation modes, said optical beat length greater than said acoustic wavelength, said fiber mounted on said surface for acoustic contact by said surface acoustic wave, said acoustic wave device positioned to direct said surface acoustic wave at an angle to the longitudinal axis of said optical fiber, such that said acoustic wavelength is phase matched to said optical beat length to cause cumulative coupling of light from said first mode to said second mode, said coupled light being frequency shifted and propagating along said longitudinal axis of said fiber in said second mode in the same direction as the light in said first mode.

20. A fiber optic frequency shifter, as defined by claim 19, wherein said two optical propagation modes of said optical fiber are two orthogonal polarization modes, and the acoustic wavelength of said acoustic wave is less than the optical beat length of said optical fiber for said two polarization modes.

21. A method of manufacturing a fiber optic frequency shifter, utilizing an optical fiber having a longitudinal axis and having first and second modes which propagate light at first and second velocities, respectively, in a direction along said longitudinal axis, said fiber having an optical beat length along said longitudinal axis for said first and second modes, said method comprising:

positioning a transducer to direct an acoustic wave relative to said fiber such that wave fronts of said acoustic wave acoustically contact said fiber at an angle of incidence with respect to said longitudinal axis which is less than 90° but greater than 0°; and orienting said tranducer such that the acoustic wave fronts are spaced along said longitudinal axis in accordance with the optical beat length of said fiber for said first and second modes so as to cause cumulative coupling of frequency shifted light from said first mode to said second mode at said angle of incidence, and such that said frequency shifted light propagates in said optical fiber in said direction along said longitudinal axis.

22. A method of manufacturing a fiber optic frequency shifter, as defined by claim 21, further comprising the steps of:

providing a base member having a surface for propagating said acoustic wave;

freestandingly mounting said optical fiber on said surface of said base member in acoustic contact with said surface; and applying a bonding substance to said optical fiber and said surface of said base member;

placing said bonding substance in tension to draw said fiber against said surface of said base member and to bias said fiber into increased acoustic contact with said base member.

23. The method of manufacturing a fiber optic frequency shifter, as defined by claim 22, wherein said step of placing said bonding substance in tension comprises the steps of:

applying pressure to said optical fiber to press said optical fiber against said surface of said base member while said bonding substance is curing; and removing said applied pressure after said bonding substance is cured to place said bonding substance in tension.

24. A fiber optic frequency shifter, as defined by claim 1, wherein said two modes of propagation are two spatial propagation modes.

* * * * *